US007636083B2

(12) United States Patent
Aoki et al.

(10) Patent No.: US 7,636,083 B2
(45) Date of Patent: Dec. 22, 2009

(54) METHOD AND APPARATUS FOR TEXT INPUT IN VARIOUS LANGUAGES

(75) Inventors: Ann Naomi Aoki, Seattle, WA (US); Pim Van Meurs, Kenmore, WA (US); Christina James, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 590 days.

(21) Appl. No.: 11/060,012

(22) Filed: Feb. 16, 2005

(65) Prior Publication Data

US 2005/0195171 A1      Sep. 8, 2005

Related U.S. Application Data

(60) Provisional application No. 60/546,424, filed on Feb. 20, 2004.

(51) Int. Cl.
*G06F 3/02* (2006.01)
(52) U.S. Cl. .................. 345/172; 345/171; 400/110
(58) Field of Classification Search ............ 434/319, 434/185; 341/28, 20, 22; 400/110, 100, 400/489, 472, 484, 486; 455/564; 715/535, 715/526, 530; 704/8, 260, 235; 345/171, 345/168, 172; 707/101, 102; 379/368
See application file for complete search history.

(56) References Cited

U.S. PATENT DOCUMENTS

| | | | | |
|---|---|---|---|---|
| 3,908,288 | A | * | 9/1975 | Brown, Jr. ............. 434/319 |
| 4,500,872 | A | * | 2/1985 | Huang .................. 341/28 |
| 4,655,621 | A | * | 4/1987 | Holden ................ 400/100 |
| 4,679,951 | A | * | 7/1987 | King et al. ............ 400/110 |
| 4,872,196 | A | * | 10/1989 | Royer et al. ........... 455/564 |
| 5,109,352 | A |  | 4/1992 | O'Dell |

(Continued)

FOREIGN PATENT DOCUMENTS

EP        271619 A1 *  6/1988

(Continued)

OTHER PUBLICATIONS

R.K. Joshi, "An Intelligent Multi-layered Input Scheme for Phonetic Scripts", Proceedings of the 2nd international symposium on Smart graphics, pp. 35-38, 2002.*

(Continued)

*Primary Examiner*—Chanh Nguyen
*Assistant Examiner*—Ram A Mistry
(74) *Attorney, Agent, or Firm*—Michael A. Glenn; Glenn Patent Group

(57) ABSTRACT

A method and apparatus for facilitating text input for network applications, such as, for example, wireless applications, are described. Multiple input signals are received from a user, each input signal corresponding to a key within a user input interface and further representing Latin, e.g. English, language phonetic equivalents of at least one language character including a language character intended by the user to form a word construct in a language. Each input signal is further used to generate at least one proposed language character. At least one proposed word construct is further formed in the language using the at least one proposed language character. Finally, the at least one proposed word construct is displayed for the user on a display screen.

17 Claims, 15 Drawing Sheets

U.S. PATENT DOCUMENTS

| | | | | |
|---|---|---|---|---|
| 5,212,638 | A * | 5/1993 | Bernath | 715/535 |
| 5,458,425 | A * | 10/1995 | Torok | 400/489 |
| 5,802,482 | A * | 9/1998 | Sun | 704/8 |
| 5,945,928 | A * | 8/1999 | Kushler et al. | 341/28 |
| 5,952,942 | A | 9/1999 | Balakrishnan et al. | |
| 5,999,950 | A * | 12/1999 | Krueger et al. | 715/535 |
| 6,005,498 | A * | 12/1999 | Yang et al. | 341/23 |
| 6,009,444 | A | 12/1999 | Chen | |
| 6,054,941 | A | 4/2000 | Chen | |
| 6,098,086 | A * | 8/2000 | Krueger et al. | 715/535 |
| 6,104,317 | A | 8/2000 | Panagrossi | |
| 6,169,538 | B1 | 1/2001 | Nowlan et al. | |
| 6,172,625 | B1 | 1/2001 | Jin et al. | |
| 6,204,848 | B1 | 3/2001 | Nowlan et al. | |
| 6,275,216 | B1 * | 8/2001 | Kitamura | 345/171 |
| 6,362,752 | B1 | 3/2002 | Guo et al. | |
| 6,424,743 | B1 | 7/2002 | Ebrahimi | |
| 6,490,563 | B2 * | 12/2002 | Hon et al. | 704/260 |
| 6,502,118 | B1 | 12/2002 | Chatterjee | |
| 6,686,852 | B1 | 2/2004 | Guo | |
| 6,711,290 | B2 | 3/2004 | Sparr et al. | |
| 6,757,544 | B2 | 6/2004 | Rangarjan et al. | |
| 6,801,659 | B1 | 10/2004 | O'Dell et al. | |
| 6,807,529 | B2 | 10/2004 | Johnson et al. | |
| 6,864,809 | B2 | 3/2005 | O'Dell et al. | |
| 6,912,581 | B2 | 6/2005 | Johnson et al. | |
| 6,947,771 | B2 | 9/2005 | Guo et al. | |
| 6,955,602 | B2 | 10/2005 | Williams | |
| 6,956,968 | B1 | 10/2005 | O'Dell et al. | |
| 6,973,332 | B2 | 12/2005 | Mirkin et al. | |
| 6,982,658 | B2 | 1/2006 | Guo | |
| 7,020,849 | B1 | 3/2006 | Chen | |
| 7,057,607 | B2 | 6/2006 | Mayoraz et al. | |
| 7,075,520 | B2 | 7/2006 | Williams | |
| 7,095,403 | B2 | 8/2006 | Lyustin et al. | |
| 7,139,430 | B2 | 11/2006 | Sparr et al. | |
| 7,256,769 | B2 | 8/2007 | Pun et al. | |
| 7,257,528 | B1 | 8/2007 | Ritchie et al. | |
| 7,272,564 | B2 | 9/2007 | Phillips et al. | |
| 7,313,277 | B2 | 12/2007 | Morwing et al. | |
| 7,349,576 | B2 | 3/2008 | Holtsberg | |
| 7,389,235 | B2 | 6/2008 | Dvorak | |
| 7,437,001 | B2 | 10/2008 | Morwing et al. | |
| 7,466,859 | B2 | 12/2008 | Chang et al. | |
| 2002/0196163 | A1 | 12/2002 | Bradford et al. | |
| 2003/0023426 | A1 | 1/2003 | Pun et al. | |
| 2003/0054830 | A1 | 3/2003 | Williams et al. | |
| 2003/0119551 | A1 * | 6/2003 | Laukkanen et al. | 455/556 |
| 2003/0144830 | A1 | 7/2003 | Williams | |
| 2003/0179930 | A1 | 9/2003 | O'Dell et al. | |
| 2003/0195741 | A1 * | 10/2003 | Mani et al. | 704/8 |
| 2004/0153963 | A1 | 8/2004 | Simpson et al. | |
| 2004/0153975 | A1 | 8/2004 | Williams et al. | |
| 2005/0027524 | A1 | 2/2005 | Wu et al. | |
| 2005/0114770 | A1 | 5/2005 | Sacher et al. | |
| 2006/0129928 | A1 | 6/2006 | Qiu | |
| 2006/0136408 | A1 | 6/2006 | Weir et al. | |
| 2006/0155536 | A1 | 7/2006 | Williams et al. | |
| 2006/0158436 | A1 | 7/2006 | LaPointe et al. | |
| 2006/0173807 | A1 | 8/2006 | Weir et al. | |
| 2006/0193519 | A1 | 8/2006 | Sternby | |
| 2006/0236239 | A1 | 10/2006 | Simpson et al. | |
| 2006/0239560 | A1 | 10/2006 | Sternby | |
| 2007/0094718 | A1 | 4/2007 | Simpson | |
| 2007/0203879 | A1 | 8/2007 | Templeton-Steadman et al. | |
| 2007/0276814 | A1 | 11/2007 | Williams | |
| 2007/0285397 | A1 | 12/2007 | LaPointe et al. | |
| 2008/0130996 | A1 | 6/2008 | Sternby | |

FOREIGN PATENT DOCUMENTS

| | | | |
|---|---|---|---|
| GB | 2227110 A * | 7/1990 | |
| WO | WO 2004/111812 | 12/2004 | |
| WO | WO 2004/111871 | 12/2004 | |
| WO | WO 2006/026908 | 3/2006 | |

OTHER PUBLICATIONS

Amit Rathod, "A Dynamic Text Input scheme for phonetic scripts like Devanagari", Proceedings of Development by Design, 2002, 5 pages.*

Bocker, Martin, "Standardization Supporting Cultural Diversity: Multicultural Aspects of Good ICT Design for Mobiles", <URL: http://www.etsi.com/ictroadshow/presentations/standardization_supporting_cultural_diversity_martin_bocker_cph.ppt>, Sep. 5, 2005, Rev PA1, p. 18, Retrieved from Internet on Oct. 20, 2006.

"Greek Default GSM Layout", <URL:http//www.t9.com/help_docs/greek_examples.pdf> Retrieved on Oct. 20, 2006.

"Omniglot Writing Systems & Languages of the World" <URL:http//www.omniglot.com/writing/greek.htm>, Retrieved on Oct. 20, 2006.

"Romanization", <URL:http:en.wikipedia.org/wiki/Romanization>, Retrieved on Oct. 20, 2006.

"Transliteration", <URL: http:en.wikipedia.org/wiki/Transliteration>, Retrieved on Oct. 20, 2006.

"Transliteration_of_Greek_to_Latin_alphabet", <URL:http:en.wikipedia.org/wiki/Transliteration>, Retrieved on Oct. 20, 2006.

"Transcription (linguistics)", <URL:http:en.wikipedia.org/wiki/Transcription/%28linguistics%29>, Retrieved on Oct. 20, 2006.

* cited by examiner

*Bengali Standard
Keyboard Layout*

| UNICODE | CHAR Key-1 | NAME | UNICODE | CHAR Key-2 | NAME | UNICODE | CHAR Key-3 | NAME |
|---|---|---|---|---|---|---|---|---|
| U+0964 | ׀ | danda | U+0985 | অ | A | U+09A1 | ড | DDA |
| U+003F | ? | question | U+0986 | আ | AA | U+09A2 | ঢ | DDHA |
| U+002C | , | comma | U+09BE | া | aa | U+09A6 | দ | DA |
| U+0021 | ! | exclama | U+09AC | ব | BA | U+09A7 | ধ | DHA |
| U+002E | . | period | U+09AD | ভ | BHA | U+098F | এ | E |
| U+002D | - | hyphen | U+099A | চ | CA | U+09C7 | ে | e |
| U+003B | ; | semi-colon | U+099B | ছ | CHA | U+09E9 | ৩ | bangla 3 |
| U+003A | : | colon | U+09E6 | ২ | bangla 2 | U+0033 | 3 | digit 3 |
| U+09E7 | ১ | bangla 1 | U+0032 | 2 | digit 2 | | | |
| U+0031 | 1 | digit 1 | | | | | | |

*FIG. 3*

*Bengali Standard Keyboard Layout*

| Key-4 | | | Key-5 | | | Key-6 | | |
|---|---|---|---|---|---|---|---|---|
| U+0997 | গ | GA | U+099C | জ | JA | U+09AE | ম | MA |
| U+0998 | ঘ | GHA | U+099D | ঝ | JHA | U+09A3 | ণ | NNA |
| U+09B9 | হ | HA | U+09AF | য | YA | U+09A8 | ন | NA |
| U+0983 | ঃ | visarga | U+0995 | ক | KA | U+0999 | ঙ | NGA |
| U+0987 | ই | I | U+099B | খ | KHA | U+099E | ঞ | NYA |
| U+0988 | ঈ | II | U+09B2 | ল | LA | U+0981 | ঁ | candra |
| U+09BF | ি | I | U+09EB | ৫ | bangla 5 | U+0982 | ং | anusvara |
| U+09C0 | ী | II | U+0035 | 5 | digit 5 | U+0990 | ঐ | AI |
| U+09EA | ৪ | bangla 4 | | | | U+0993 | ও | O |
| U+0034 | 4 | digit 4 | | | | U+0994 | ঔ | AU |
| | | | | | | U+09C8 | ৈ | ai |
| | | | | | | U+09CB | ো | o |
| | | | | | | U+09CC | ৌ | au |
| | | | | | | U+09EC | ৬ | bangla 6 |
| | | | | | | U+0036 | 6 | digit 6 |

*FIG. 3*
*(Continued)*

*Bengali Standard*
*Keyboard Layout*

| UNICODE | CHAR | NAME | UNICODE | CHAR | NAME | UNICODE | CHAR | NAME |
|---|---|---|---|---|---|---|---|---|
| *Key-7* | | | *Key-8* | | | *Key-9* | | |
| U+09AA | প | PA | U+099F | ট | TTA | U+09DF | য় | YYA |
| U+09AB | ফ | PHA | U+09A0 | ঠ | TTHA | U+09EF | ৯ | bangla 9 |
| U+098B | ঋ | VOO-R | U+09A4 | ত | TA | U+0039 | 9 | digit 9 |
| U+09B0 | র | RA | U+09A5 | থ | THA | | | |
| U+09DC | ড় | RRA | U+0989 | উ | U | | | |
| U+09DD | ঢ় | RHA | U+098A | ঊ | UU | | | |
| U+09C3 | ৃ | voc-r | U+09C1 | ু | u | | | |
| U+09B6 | শ | SHA | U+09C2 | ূ | uu | | | |
| U+09B7 | ষ | SSA | U+09EE | ৮ | bangla 8 | | | |
| U+09B8 | স | SA | U+0038 | 8 | digit 8 | | | |
| U+09ED | ৭ | bangla 7 | | | | | | |
| U+0037 | 7 | digit 7 | | | | | | |

| Key-* | | | Key-0 | | | Key-# | | |
|---|---|---|---|---|---|---|---|---|
| | | | U+09C0 | ী | halant | U+0020 | | space |
| | | | U+09BC | ় | nukia | | | |
| | | | U+09EG | ০ | bangla 0 | | | |
| | | | U+0030 | 0 | digit 0 | | | |

FIG. 3
(Continued)

*Bengali Standard*
*Keyboard Layout*

| UNICODE | CHAR | NAME | UNICODE | CHAR | NAME | UNICODE | CHAR | NAME |
|---|---|---|---|---|---|---|---|---|
| Key-1 | | | Key-2 | | | Key-3 | | |
| U+002E | . | period | U+0B85 | அ | A | U+0B8E | எ | E |
| U+003F | ? | question | U+0B86 | ஆ | AA | U+0B8F | ஏ | EE |
| U+002C | , | comma | U+0B90 | ஐ | AI | U+0BC6 | ெ | e |
| U+0021 | ! | exclama | U+0B94 | ஔ | AU | U+0BC7 | ே | ee |
| U+002D | - | hyphen | U+0BBE | ா | aa | U+0033 | 3 | digit 3 |
| U+003B | ; | semi-colon | U+0BCB | ொ | ai | | | |
| U+003A | : | colon | U+0BCC | ௌ | au | | | |
| U+0031 | | digit 1 | U+0BD7 | ௗ | au mark | | | |
| | | | U+0B9A | ச | CA | | | |
| | | | U+0032 | 2 | digit 2 | | | |
| Key-4 | | | Key-5 | | | Key-6 | | |
| U+0BB9 | ஹ | ha | U+0B9C | ஜ | JA | U+0BAE | ம | MA |
| U+0B87 | இ | I | U+0B95 | க | KA | U+0B99 | ங | NGA |
| U+0B88 | ஈ | II | U+0BB2 | ல | LA | U+0B9E | ஞ | NYA |
| U+0BBF | ி | I | U+0BB3 | ள | LLA | U+0BA3 | ண | NNA |
| U+0BC0 | ீ | II | U+0BB4 | ழ | LLLA | U+0BAB | ந | NA |
| U+0034 | 4 | digit 4 | U+0035 | 5 | digit 5 | U+0BA9 | ன | NNNA |
| | | | | | | U+0B92 | ஒ | O |
| | | | | | | U+0B93 | ஓ | OO |
| | | | | | | U+0BCA | ொ | o |
| | | | | | | U+0BCB | ோ | oo |
| | | | | | | U+0036 | 6 | digit 6 |

*FIG. 5*

*Bengali Standard
Keyboard Layout*

| UNICODE | CHAR | NAME | UNICODE | CHAR | NAME | UNICODE | CHAR | NAME |
|---|---|---|---|---|---|---|---|---|
| Key-7 | | | Key-8 | | | Key-9 | | |
| U+0BAA | ப | PA | U+0B9F | ட | TTA | U+0BAF | ய | YA |
| U+0BB0 | ர | RA | U+0BA4 | த | TA | U+0039 | 9 | digit 9 |
| U+0BB1 | ற | RRA | U+0B89 | உ | U | | | |
| U+0BB7 | ஷ | SSA | U+0B8A | ஊ | UU | | | |
| U+0BB8 | ஸ | SA | U+0BC1 | ◌ு | u | | | |
| U+0037 | 7 | digit 7 | U+0BC2 | ◌ூ | uu | | | |
| | | | U+0BB5 | வ | VA | | | |
| | | | U+0038 | 8 | digit 8 | | | |

| | | | | | | | | |
|---|---|---|---|---|---|---|---|---|
| Key-* | | | Key-0 | | | Key-# | | |
| | | | U+0BCD | ◌் | virama | U+0020 | | space |
| | | | U+0B83 | ஃ | visarga | | | |
| | | | U+0B62 | ◌ | anusvara | | | |
| | | | U+0030 | 0 | digit 0 | | | |

*FIG. 5*
*(Continued)*

| NAME | UNICODE | CHAR Key-2 | NAME | UNICODE | CHAR Key-3 | NAME |
|---|---|---|---|---|---|---|
| danda | U+0905 | अ | A | U+0921 | ड | DDA |
| abbrev. | U+0906 | आ | AA | U+0922 | ढ | DDHA |
| question | U+0910 | ऐ | AI | U+0926 | द | DA |
| comma | U+0914 | औ | AU | U+0927 | ध | DHA |
| period | U+093E | ा | aa | U+090D | ऍ | candra-E |
| exclama | U+0948 | ै | ai | U+090F | ए | E |
| hyphen | U+094C | ौ | au | U+0945 | ॅ | candra-e |
| colon | U+092C | ब | BA | U+0947 | े | e |
| semi-colon | U+092D | भ | BHA | U+095C | ड़ | DDDHA |
| digit 1 | U+091A | च | CA | U+095D | ढ़ | RHA |
| | U+091B | छ | CHA | U+0033 | 3 | digit 3 |
| | U+0032 | 2 | digit 2 | | | |

| NAME | UNICODE | CHAR Key-5 | NAME | UNICODE | CHAR Key-6 | NAME |
|---|---|---|---|---|---|---|
| GA | U+091C | ज | JA | U+092E | म | MA |
| GHA | U+091D | झ | JHA | U+091E | ञ | NYA |
| HA | U+0915 | क | KA | U+0923 | ण | NNA |
| visarga | U+0916 | ख | KHA | U+0928 | न | NA |
| I | U+0932 | ल | LA | U+0919 | ङ | NGA |
| II | U+095B | ज़ | ZA | U+0902 | ं | anusvara |
| i | U+0958 | क़ | QA | U+0901 | ँ | candrabindu |
| ii | U+0959 | ख़ | KHHA | U+0913 | ओ | O |
| bangla 4 | U+0933 | ळ | LLA | U+0911 | ऑ | candra-O |
| digit 4 | U+0035 | 5 | digit 5 | U+094B | ो | o |

FIG. 7

| UNICODE | CHAR | NAME | UNICODE | CHAR | NAME | UNICODE | CHAR | NAME |
|---|---|---|---|---|---|---|---|---|
| | Key-7 | | | Key-8 | | | Key-9 | |
| U+092A | प | PA | U+091F | ट | TTA | U+092F | य | YA |
| U+092B | फ | PHA | U+0920 | ठ | TTHA | U+095F | य़ | YYA |
| U+090B | ऋ | vocal-R | U+0924 | त | TA | U+0039 | 9 | digit 9 |
| U+0930 | र | RA | U+0925 | थ | THA | | | |
| U+0943 | ृ | vocal-R | U+0909 | उ | U | | | |
| U+0936 | श | SHA | U+090A | ऊ | UU | | | |
| U+0937 | ष | SSA | U+0941 | ु | u | | | |
| U+0938 | स | SA | U+0942 | ू | uu | | | |
| U+095E | फ़ | FA | U+0935 | व | VA | | | |
| U+0037 | 7 | digit 7 | U+0038 | 8 | digit 8 | | | |
| | Key-* | | | Key-0 | | | Key-# | |
| | | | U+093C | ़ | nukta | | | space |
| | | | U+094D | ् | virama | | | |
| | | | U+0030 | 0 | digit 0 | | | |

*FIG. 7*
*(Continued)*

METHOD AND APPARATUS FOR TEXT INPUT IN VARIOUS LANGUAGES

CROSS-REFERENCE TO RELATED APPLICATIONS

This patent application is related and claims priority from U.S. Provisional Patent Application Ser. No. 60/546,424, filed on 20 Feb. 2004, and entitled "INDIC KEYBOARDS," and which is incorporated by reference in its entirety herein.

TECHNICAL FIELD

The invention relates generally to the field of network-based communications and, more particularly, to a method and apparatus for facilitating text input for applications such as, for example, wireless applications.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail ("e-mail").

It would therefore be advantageous to develop a keyboard for entry of text into a computer device that is both small and operable with one hand while the user is holding the device with the other hand. Prior development work has considered use of a keyboard that has a reduced number of keys. As suggested by the keypad layout of a touch-tone telephone, many of the reduced keyboards have used a 3-by-4 array of keys. A number of the keys in the array contain multiple characters. There is therefore ambiguity in a sequence of keys entered by a user, since each keystroke may indicate one of several letters. Several approaches have been suggested for resolving the ambiguity of the keystroke sequence.

One suggested approach for unambiguously specifying characters entered on a reduced keyboard requires the user to enter two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. The Arnott article also notes that several disambiguating systems have attempted to use word-level disambiguation to decode text from a reduced keyboard. Word-level disambiguation disambiguates entire words by comparing the sequence of received keystrokes with possible matches in a dictionary after the receipt of an unambiguous character signifying the end of the word. The Arnott article discusses many of the disadvantages of word-level disambiguation. For example, word-level disambiguation oftentimes fails to decode a word correctly, because of the limitations in identifying unusual words and the inability to decode words that are not contained in the dictionary. Because of the decoding limitations, word-level disambiguation does not give error-free decoding of unconstrained text with an efficiency of one keystroke per character. The Arnott article therefore concentrates on character level disambiguation rather than word-level disambiguation, and indicates that character level disambiguation appears to be the most promising disambiguation technique.

Disambiguating an ambiguous keystroke sequence continues to be a challenging problem. One significant challenge facing any application of word-level disambiguation is designing a keyboard that enables the system to efficiently disambiguate input keystroke sequences. With an ordinary typewriter or word processor, each keystroke represents a unique character. With word-level disambiguation, since each keystroke represents multiple characters, any sequence of keystrokes may match multiple words or word stems. It would therefore be desirable to develop a disambiguating system that minimizes the ambiguity of entered keystrokes, and also maximizes the efficiency with which the user can resolve any ambiguity which does arise during text entry.

This means that the arrangement of letters on keys should tend to minimize the average number of word choices that correspond to a given keystroke sequence, and in particular to minimize the number of instances where two different frequently occurring words correspond to the same keystroke sequence. Optimizing a keyboard arrangement according to this criterion tends to result in arrangements where letters appear to have been randomly grouped on the keys. Thus, although such arrangements are ultimately efficient to use, they are difficult to learn, and may not be acceptable to many users due to their unfamiliar appearance.

The alternative is to design keyboards based on organizing letters according to a common or well known arrangement of the letters or syllables of a language. This results in a keyboard with an appearance which is more familiar to the general user, and thus tends to be more acceptable and easier to learn. However, this goal can conflict with the goal of designing a keyboard that increases the efficiency with which key sequences can be disambiguated.

In order to create an effective word-level disambiguating reduced keyboard input system for Hindi, Bengali, Tamil, and similar Indic languages, a keyboard must be designed that meets both of these criteria. First, the arrangement of the symbols of the language must be easy for a native speaker to understand and learn to use. Second, the arrangement must not result in so much ambiguity that the efficiency of the reduced keyboard system is impaired.

SUMMARY OF THE INVENTION

The invention provides a reduced keyboard for Indic languages and other languages which uses word-level disambiguation to resolve ambiguities in keystrokes. In one embodiment, the keyboard is constructed with mechanical keys on a standard cellular telephone keypad. Alternatively, the system may be implemented on a display panel which is touch sensitive, wherein contact with the surface of the display generates input signals to the system corresponding to the location of contact.

A plurality of letters and symbols are assigned to some of the keys, so that keystrokes on these keys (hereinafter the "data keys") are ambiguous. A user may enter a keystroke sequence wherein each keystroke corresponds to the entry of one letter or symbol of a word construct. Because individual keystrokes are ambiguous, the keystroke sequence can potentially match more than one word with the same number of letters or symbols. The keystroke sequence is processed by vocabulary modules which match the sequence to corresponding stored words or other interpretations. Words and partial words that match the sequence of keystrokes are presented to the user in a selection list on the display as each keystroke is received.

The present invention discloses a design for arranging Indic alphabets on a keyboard in such a way as to meet the above two criteria. The result is a reduced keyboard that is easily understood and quickly learned by native speakers of Indic languages, and that is efficient for purposes of disambiguating textual interpretations of input keystroke sequences.

In an embodiment, a method and apparatus for facilitating text input for applications such as, for example, wireless applications, are described. Multiple input signals are received from a user, each input signal corresponding to a key within a user input interface and further representing Latin-based, e.g. English, language phonetic equivalents of at least one language character including a language character intended by the user to form a word construct in a language. In another embodiment, one or more successive input signals also represent at least one proposed language character. At least one proposed word construct is further formed in the language using the at least one proposed language character. Finally, the at least one proposed word construct is displayed for the user on a display screen.

BRIEF DESCRIPTION OF THE DRAWINGS

FIG. 3 illustrates a keyboard layout for facilitating Bengali text input according to one embodiment of the invention;

FIG. 5 illustrates a keyboard layout for facilitating Tamil text input according to an alternate embodiment of the invention;

FIG. 7 illustrates a keyboard layout for facilitating Hindi text input according to an alternate embodiment of the invention;

DETAILED DESCRIPTION

Figure 1:
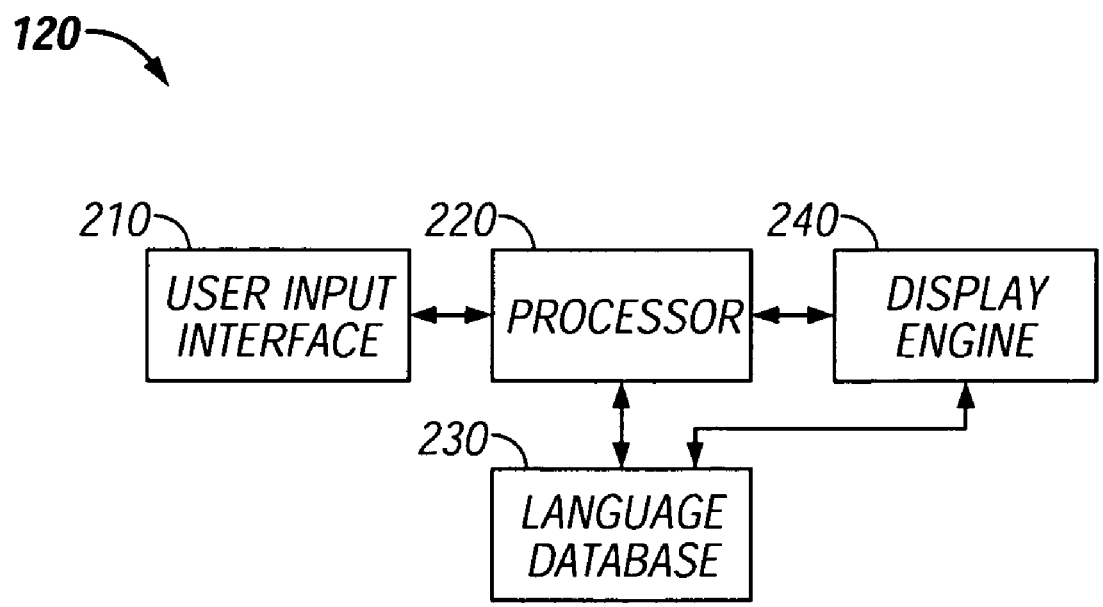
FIG. 1 is a block diagram of a wireless user handset according to one embodiment of the invention.

A method and apparatus for facilitating text input for application such as, for example, wireless applications are described. In the following description, for purposes of explanation, numerous specific details are set forth in order to provide a thorough understanding of the invention. It will be evident, however, to one skilled in the art that the present invention may be practiced without these specific details.

In the following description, embodiments of the invention are presented in the context of Indic language characters, such as, for example, Hindi language characters, Bengali language characters, and Tamil language characters, although the invention is not limited to these languages. The following alphabet and script terminology applies:

Alphabet and Script Terminology

Letter: A character representing one or more of the simple or compound sounds used in speech. It can be any of the alphabetic symbols.

Conjunct/Ligature: A letter that is a combination of two or more basic letters. The visual display of the conjunct may or may not give clue to its constituent letters e.g. "æ"

Diacritic Mark/Sign: A mark added to a letter that distinguishes it from the same letter without a mark, usually having a different phonetic value or stress.

Vowel: A letter representing a speech sound made with the vibration on the vocal cords, but without audible obstruction. (Can be full-width or zero-width.)

Vowel Sign (matra): A graphic character associated with a letter, to indicate a vowel to be associated with that letter. (Always zero-width.)

Diphthong: A compound vowel character in which the articulation begins as for one vowel and moves into the other vowel, e.g. coin, loud, said, applaud, aoki.

Consonant: A letter representing a speech sound in which the breath is at least partially obstructed, and which is typically combined with a vowel to form a syllable. Note: Indic consonants have an implicit vowel (a).

Pure consonant: A consonant that does not have any vowel implicitly associated with it, such as the case with all English consonants. A vowel is always combined with a pure consonant to form a syllable.

Dead consonant: A consonant whose implicit vowel is declined (removed) by appending a virama/halant.

Nasal consonant: A consonant pronounced with the breath passing through the nose. e.g m, n, ng.

Nasalized vowel: A vowel pronounced with the breath passing both through the nose and the mouth. In Indian scripts this is denoted by a Chandrabindu.

Aspirated consonant: A consonant that is pronounced with an extra puff of air coming out at the time of release of the oral obstruction. This has a sound of an extra "h."

Vargs: Phonetic groupings of Indic consonants. There are five total vargs with five consonsants in each varg.

Non-varg: Grouping of Indic consonants outside of standard vargs.

Syllable: A unit of pronunciation uttered without interruption, forming whole or part of a word, and usually having one vowel or diphthong sound optionally surrounded by one or more consonants.

Alphabet: A set of letters used in writing a language, e.g. the English alphabet consists of upper and lower case letters A to Z.

Basic Alphabet: The minimal set of characters that can be used for uniquely encoding every word of a language, e.g, The English basic alphabet consists of only the upper case letters A to Z.

Phonetic Alphabet: An alphabet that has direct correspondence between letters and sounds.

Latin/Roman Alphabet: The alphabet used for writing the language of ancient Rome. Used today for writing English and some other European languages.

Script: A distinctive and complete set of characters used for the written form of one or more languages.

Roman script: The script based on the ancient Roman alphabet, with the letters A-Z and additional diacritic marks. Used for writing a language that is not usually written in the Roman alphabet.

Indic scripts: Ten unique scripts derived from the ancient Brahmi script that are used for writing twelve of the fifteen official languages of India.

Romanization: The representation of words of a script using the Roman alphabet, possibly through addition of diacritic marks e.g. Romaji is the Romanized form of the Japanese script.

Transliteration: The representation of words with the closest corresponding letters in an alphabet of a different language. (Not to be confused with translation).

International Numerals: The conventional digits 0 to 9 that are used in English for denoting numbers. These are also known as Indo-Arabic numerals.

Native Numerals: The native digits of a particular script which have shapes distinct from their international counterparts.

Furthermore, the following font and display terminology applies:

Font and Display Terminology

Font: A set of symbols that are used for the display or printing of a script in a particular style.

Glyph: A unique display symbol within the font symbol set.

Full-width character: A character that advances the display cursor by one.

Zero-width character: A character that appends itself to the character it follows (or, in some cases, to the character that it precedes, e.g. the Bengali YA-PHALLAH).

Display rendering: The process by which a string of characters is displayed or printed. In this process several consecutive characters may combine with each other on the screen. The sequence display of the characters may become different.

Display composing: The process of organizing the basic shapes available in a font in order to display or print a word.

Finally, the following character encoding terminology applies:

Character Encoding Terminology

Bit: Binary digit: It can have only two values: 0 and 1.

Byte: A bit string that is operated upon as a unit. It usually represents a character and usually consists of eight bits.

Character: A symbol that can represent a letter, a numeral, a punctuation mark, a special symbol, or even a control function.

Control character: A character that normally has no visual form, but affects the recording, processing, transmission or interpretation of data.

Escape sequence: A sequence of characters, often beginning with a control character, that changes the normal interpretation of a character stream, e.g., to switch to an alternate character set.

Graphic character: A character, other than a control character, that has a visual a representation.

7-bit characters: Characters whose code has seven bits allowing representation of 128 characters.

8-bit characters: Characters whose code has eight bits allowing representation of 256 characters.

Character set: A set of characters grouped together for a purpose, like that of representing a script.

Code table: A table showing the positions allotted to individual characters from a character set.

Character code: Position in the code table of the character.

Code extension: The techniques for encoding of characters that are not included in the character set of a given code.

Extended character set: Characters which are not present in the main character set, but are available through some code extension techniques.

Transcoding: A set of tables and rules by which a code-table can be transformed to another code-table, such that the characters get mapped to their equivalent forms.

ASCII code: American Standard Code for Information Interchange: 7-bit code which specifies 32 control characters and 96 graphic characters for the English language.

ISCII: Indian Standard Code for Information Interchange: The character code for Indian languages that originate from Brahmi script. Unlike Unicode, ISCII is an 8-bit encoding that uses escape sequences to announce the particular Indic script represented by a following coded character sequence.

Unicode: A multilingual encoding that requires no escape sequences or switching between scripts. For any given Indic script, the consonant and vowel letter codes of Unicode are based on ISCII, so they correspond directly (more or less).

In the case of most non-Indic languages in Unicode, each Unicode character can be represented by a single Unicode encoded value and one corresponding display glyph. Unicode, however, does not have individually encoded glyphs to display/render all of the combining characters that are utilized in the scripts of Indian languages. These Indic combining characters are the "half" or "subjoined letters" (conjuncts/ligatures) of the Indic scripts that represent multiple consonant combinations or certain consonant-vowel or consonant-modifier or consonant-vowel-modifier combinations.

Unicode does, however, represent the basic alphabet for each of the Indic languages, thus permitting the encoding and spelling of any/all words in each of the Indic languages.

Each Unicode encoded character of the subject language's basic alphabet is available both ambiguously and explicitly across keys 2-9 and 0 of the keypad within the user input interface 210 of the wireless handset 120, enabling the user to spell all of the words that are found in the language database 230 and to create custom words for addition into the user's database 230. These Unicode characters are sequenced, within a word, in the same order as they would be pronounced.

Indic scripts are read, like English, from left to right. However, the vowel signs do not necessarily follow the consonant once displayed. The display/rendering order of the characters may be different from the phonetic order of the characters, however having a spelling according to the phonetic order allows a word to be typed in the same way, regardless of the script it is to be displayed in.

By using only the basic characters in Unicode, there is typically only one unique way of typing a word. This would not have been possible if conjuncts/ligatures had each been assigned separate codes. The spelling of a word is the phonetic order of the constituent base characters of the alphabet. The spelling of a word contains all of the information necessary for display composition, which can be automatically done through display algorithms within the display engine 240.

Indian Alphabet Base Characters

Consonants:

Indian script consonants have an implicit vowel (a) included in them. They have been categorized according to their phonetic properties. There are five vargs (groups) with five consonants each and one non-varg group of consonants. The first four consonants of each varg are the primary and secondary pairs. The second consonant of each pair is the aspirated counterpart (has an additional h sound) of the first one. The last consonant of each varg is a nasal one.

Each group is pronounced using different parts of the palate, beginning with the consonants that are pronounced in the back of the palate and proceeding to those that are pronounced in the front.

Vowel Letters and Vowel Signs (Matras):

Indic script vowels that are pronounced independently, that is, either at the beginning of a word or after a vowel sound, each have independent letters to represent them. Indic script consonants each have an implicit vowel (a) "built in" to them. To indicate a vowel sound other than the implicit one, a vowel sign (a matra) is appended to the consonant. There are equivalent combining vowel signs (matras) for all of the vowel letters, except for the implicit vowel (a). While a vowel letter can be used independently, the combining vowel signs (matras) are valid only after a consonant.

Vowel Omission Sign: Virama (HI)/Halant (HI)/Hasanta (BN)/Pulli (TA):

As Indic script consonants each have an implicit vowel (a) within them, a special sign, known as the virama/halant in Hindi, is required if the implicit vowel is not desired. Thus, the consonant PA is pronounced "pa" with the implicit vowel (a). PA+virama is pronounced "p" (without the implicit vowel (a)), permitting a subsequent consonant such as RA to be appended to it, resulting in "pra". Without the virama between the two consonants the pronunciation would be "pa-ra". In practice, a virama sign is displayed only if the consonants do not change their shape by joining up. In Northern languages, the virama at the end of a word generally gets dropped, although the ending still gets pronounced without a vowel. In Southern languages and in Sanskrit, the virama at the end of the word is always used to indicate a vowel-less ending. This is the case in the Tamil language.

Conjuncts/Ligatures:

Indian scripts contain numerous conjuncts, which are clusters of up to four consonants without the intervening implicit vowels. The shape of these conjuncts can differ from those of the constituent consonants. These conjuncts are encoded/spelled in Unicode encoding by putting the virama character between the constituent consonants. Indian scripts also contain unique conjuncts comprised of consonant+matra+special sign clusters. Tamil script has no conjuncts, and thus the virama/pulli is always displayed.

Character Modifiers: Candrabindu, Anusvara and Visarga:

The Candrabindu (meaning "moon dot") denotes nasalization of the vowel that it follows (it can be appended to a consonant to modify the implicit vowel of the consonant, or appended to a vowel letter or sign). In Devanagari script the Candrabindu often gets substituted with the Anusvara, as the latter is more convenient for writing. There are some examples, however, where the usage results in different word meanings. The Anusvara denotes nasalization of the consonant that it precedes. This sign is not used in Tamil. The Visarga comes after a vowel sound and in Hindi and Bengali represents an aspirated sound similar to "h".

In Tamil, in this invention herein, this sign is found on the zero-key of the keypad of the user input interface 210. (See FIG. 1 and the discussion below).

Diacritic Mark: Nukta:

The nukta is a diacritic mark that appears in characters in some Northern scripts. In Hindi and in Bengali the nukta is built into the consonant (one Unicode value and glyph), however it can be derived in Hindi and in Hindi and Bengali explicit mode by using two key presses (as taught below).

This diacritic mark is not used in Tamil script. The nukta is used for deriving five other consonants that are required for Urdu from the Devanagari and Punjabi scripts (if Urdu is transliterated into Devanagari or Punjabi script).

Punctuation:

All punctuation marks used in Indian scripts are borrowed from English. The one exception is the Danda, which is the full stop, used in Northern Indic scripts. Hindi and Bengali both use the Devanagari Danda as their default embedded punctuation form. Tamil uses the period (English full stop) as its default embedded punctuation form. The Double Danda is used in Sanskrit texts to indicate a verse ending.

Numerals:

Many Indian scripts today use only the international numerals. Even in others, the usage of international numerals instead of the original native forms is increasing. Although the Devanagari script and the Tamil script each has its own native numeral forms, the official numeral system for each of them is the international one, and Hindi and Tamil utilize this form. Bengali has both native and international forms available.

Other Signs: Avagrah and Om:

Avagrah is primarily used in Sanskrit texts. Avagrah is not used in modern Indian scripts. The Om is a Hindu religious symbol.

Character Display/Rendering

As previously stated, the Indic writing system uses numerous combining characters that the Unicode standard does not represent. When combining Indic characters, the resulting display may sometimes be a combination of two or more glyphs, or the result may be a single unique glyph. Rudimentary examples of combining characters are the accented characters that are found in the Latin character set:

Example: The "Latin Small Letter A with Grave"—à—can be encoded in one of two ways:
Full-width Latin Small Letter A (U+0061) a+Zero-width Combining Grave Accent (U+0300) or
Full-width Latin Small Letter A with Grave (U+00E0)à
Either encoding option results in the visual display (rendering) of: à. This is equivalent to the display of two, combined Unicode encoded glyphs (a full-width plus a zero-width) or the display of one single (full-width) Unicode encoded glyph.

In the case of the Indic characters, some of them, when combined, should result in visual display forms that are often different than the sum of their individual Unicode glyph representations. In an embodiment of the invention, the form that is ultimately displayed is the decision of the display engine 240 (see FIG. 1 and the corresponding discussion below), which bases this decision on the availability of glyphs in the font.

Because most of the existing technologies assume that each Unicode character can be displayed using a single glyph, e.g. Full-width Latin Small Letter A with Grave, none of the Indic scripts can be used as is, using these technologies. See the following examples:

The glyph combinations of a full-width consonant character plus a zero-width vowel sign (matra) may visually result in the vowel sign displaying in front of the consonant, after the consonant, sandwiched between two vowel sign components (one in front and one after the consonant), or may result in the display of a unique glyph all together.

Example: The Tamil syllable "PE" is encoded in Unicode as follows:
Tamil Letter PA (0BAA)
+Tamil Vowel Sign E (0BC6)
It is displayed with the vowel sign E glyph in front of the consonant PA glyph, as follows.
Tamil syllable "PE"=PA+e=.

Example: The Tamil syllable "PAA" is encoded in Unicode as follows:
Tamil Letter PA (0BAA)
+Tamil Vowel Sign M (0BBE)
It is displayed with the vowel sign AA glyph following the consonant PA glyph.
Tamil syllable "PAA"=PA+aa=.

Example: The Tamil syllable "PO" is encoded in Unicode as follows:
Tamil Letter PA (0BAA)
+Tamil Vowel Sign O (0BCA)
Or
Tamil Letter PA (0BAA)
+Tamil Vowel Sign E (0BC6)
+Tamil Vowel Sign AA (0BBE)
It is displayed with the consonant PA glyph sandwiched in between the "parentheses-like" vowel sign glyph(s).
Tamil syllable "PO"=PA+o=PA+e+aa=.

Example: The Tamil syllable "PUU" is encoded in Unicode as follows:
Tamil Letter PA (0BAA)
+Tamil Vowel Sign UU (0BC2)

It is displayed as one single unique glyph:
Tamil syllable "PUU"=PA+uu=.

The Unicode standard encodes all "consonant clusters" by inserting the character virama between the relevant consonant letters (up to four consonants maximum).

Example: The Bangla syllable "TTA" is encoded as follows:
Full-width TA (U+09A4)
+zero-width virama (U+09CD)
+full-width TA (U+09A4).
It can be displayed in one of three ways:
TA with virama+TA
Khanda-Ta+TA=
TTA ligature glyph=

Example: The Tamil syllable SRI/SHREE is encoded as follows:
Full-width SA (U+0BB8)
+zero-width virama (U+0BCD)
+full-width RA (U+0BB0)
+zero-width ii (U+0BC0)
It should be displayed as follows:

FIG. 1 is a block diagram of a wireless user handset 120 according to one embodiment of the invention. As illustrated in FIG. 1, each wireless user handset 120 includes a user input interface 210 for enabling user input of information necessary to establish and conduct communications within a network, such as, for example, a destination address for a recipient user handset 120, and/or a text message for the recipient user handset 120, and for enabling display of information received from a potential sender user 120.

In one embodiment, the wireless user handset 120 further includes a processor 220 coupled to a language database 230 and to the user input interface 210. The processor 220 is a hardware and/or software module for receiving input signals from the user input interface and for processing the input signal to obtain word constructs containing language characters that are encoded digitally according to a standard, such as, for example, the Unicode standard available from the Unicode Consortium. The language database 230 stores the language characters and word constructs created from the stored language characters.

In one embodiment, the wireless user handset 120 further includes a display engine 240 coupled to the processor 220. The display engine 240 is a hardware and/or software module for receiving the word constructs from the processor 220 and for displaying the word constructs for the user on a display screen (not shown) within the user input interface 210.

Figure 2:
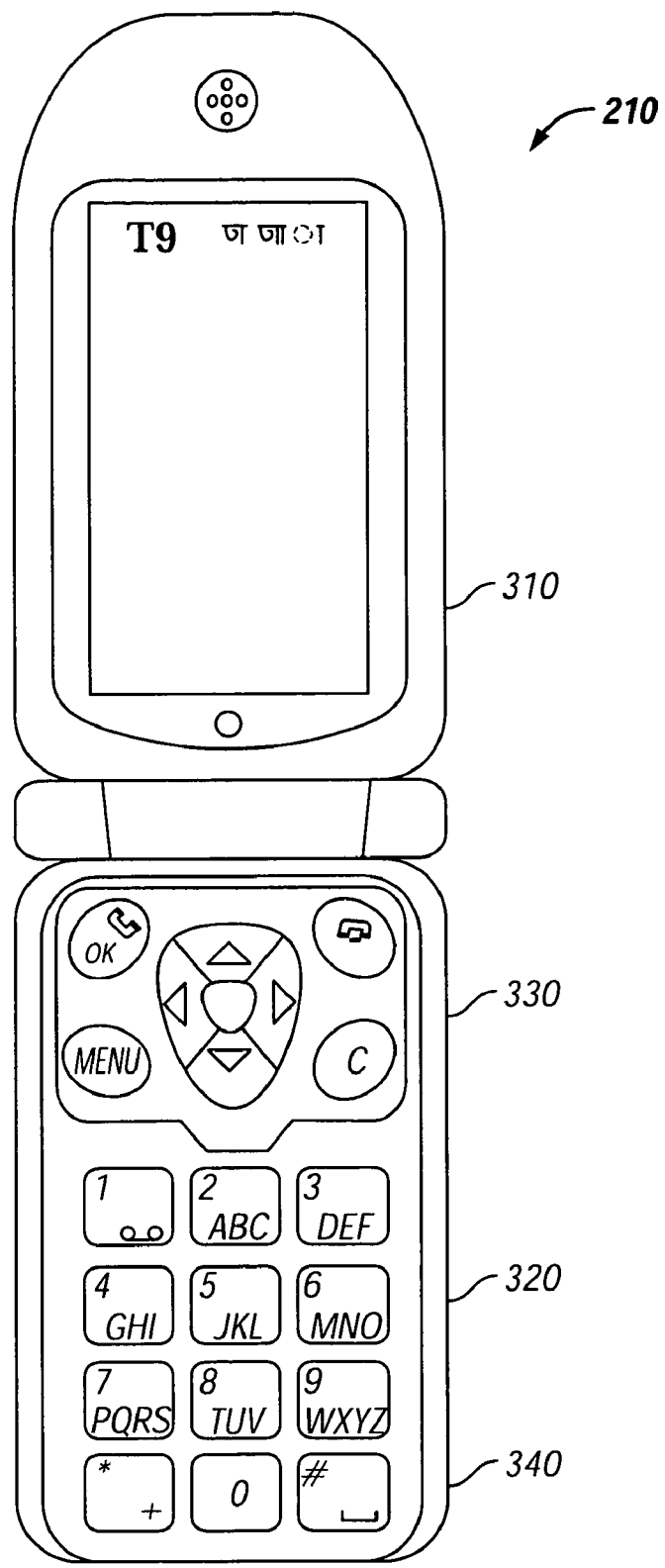
FIG. 2 illustrates a user interface for facilitating Bengali text input according to one embodiment of the invention.

FIG. 2 illustrates a user interface for facilitating text input, according to one embodiment of the invention. FIG. 3 illustrates a keyboard layout for facilitating text input according to an embodiment.

As shown in FIG. 2, in one embodiment the user input interface 210 includes a display screen 310 for displaying language characters and word constructs input by the user and for displaying messages received from sender users. The user input interface further includes a keypad 320 for enabling user input of information. The keypad 320 further includes a navigation panel 330, which contains keys used for navigation, on/off signals and other known functions, and an input panel 340, containing keys used for data input, of which the 0-9 keys, the * key and the # key are shown in FIG. 2.

Figure 4:
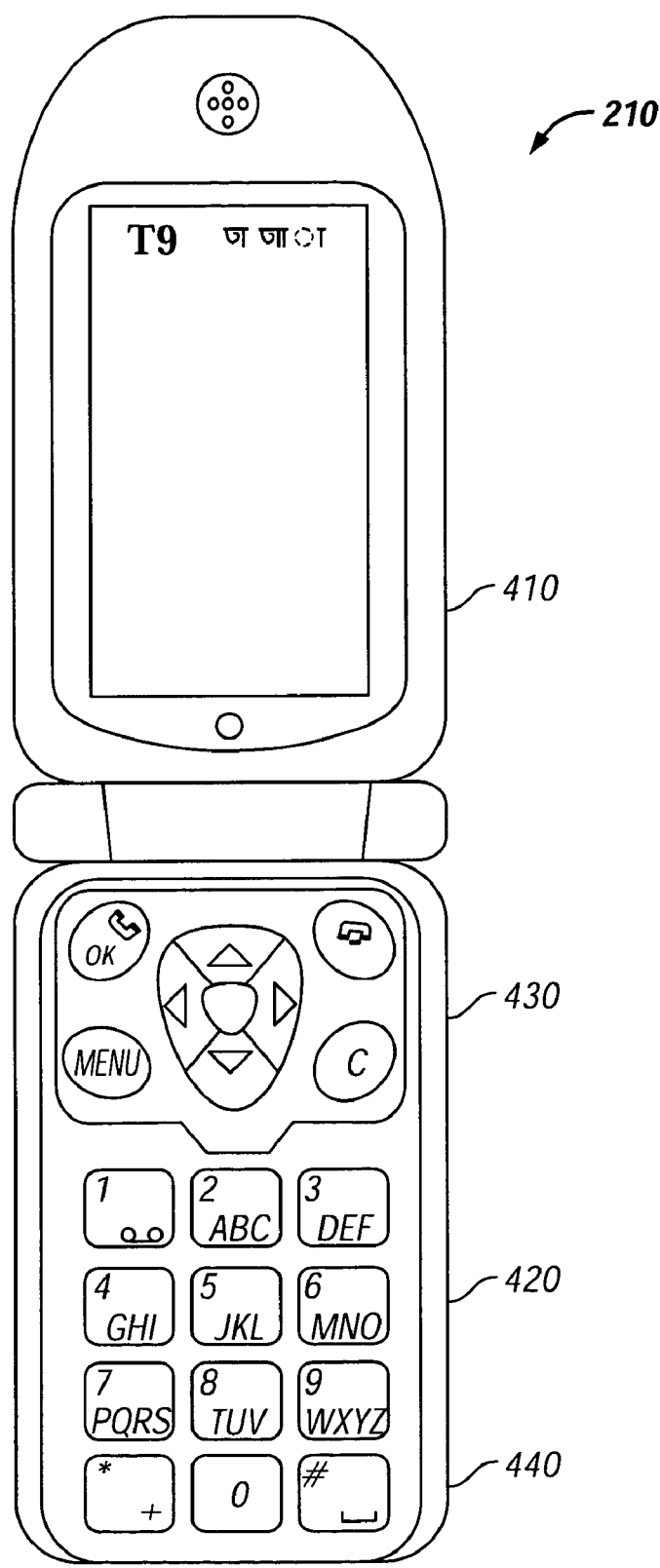
FIG. 4 illustrates a user interface for facilitating Tamil text input according to an alternate embodiment of the invention.

In one embodiment, the input panel 340 of the keypad 210 for Bengali language characters is based on the alphabetical arrangement of the Latin, e.g. English. letters of the keypad. Every Bengali character is mapped to one phonetically similar Latin letter key. The essential "hasanta" sign is found on the 0-key. All of the eleven vowel characters, 35 consonant characters, and three special signs that are needed to spell Bengali words are contained across keys 2 through 0 of the input panel 340, requiring only one key press per each desired Bengali character. The Bengali keymapping for each Bengali language character is shown in the tables of FIG. 4.

In one embodiment, if the user decides to input a sequence of Bengali language characters forming a word construct, the user begins by imagining the word in the basic Bengali alphabet and sounding it out loud. Next, the user enters each Bengali character of the word construct in phonetic sequence on the input panel 340 of the keypad 320, by pressing a single corresponding English letter key that has the same sound for the specific Bengali character. The user input interface 210 transmits an input signal corresponding to each key pressed by the user to the processor 220.

The processor 220 searches the language database 230 to form at least one proposed word construct in Bengali using the sequence of selected keys. The processor 220 further transmits the proposed word constructs to the display engine 240. The display engine 240 displays the proposed word constructs on the display screen 310. After each sequence of language characters forming a Bengali word construct is displayed on the display screen 310, if the word desired by the user is not displayed, the user selects the Next Word input, e.g., presses a down arrow key within the navigation panel 330 of the keypad 320, to view other available Bengali word construct choices.

In an alternate embodiment, one or more Bengali language characters corresponding to the selected key are displayed on the display screen 310.

Optionally, the user input interface 210 subsequently facilitates selection by the user of an intended language character from the proposed characters to form a predetermined Bengali word construct.

The foregoing similarity applies for Tamil, as shown in FIGS. 4 and 5. Figure illustrates a user interface for facilitating text input according to an embodiment of the invention. FIG. 5 illustrates a keyboard layout for facilitating text input according to the embodiment.

As shown in FIG. 4, in one embodiment the user input interface 210 includes a display screen 410 for displaying language characters and word constructs input by the user and for displaying messages received from sender users. The user input interface further includes a keypad 420 for enabling user input of information necessary to establish and conduct communications within the network 100. The keypad 420 further includes a navigation panel 430, which contains keys used for navigation, on/off signals and other known functions, and an input panel 440, containing keys used for data input, of which the 0-9 keys, the * key and the # key are shown in FIG. 4.

In one embodiment, the input panel 440 of the keypad 210 for Tamil language characters is based on the alphabetical arrangement of the Latin, e.g. English letters of the keypad. Every Tamil character is mapped to one phonetically similar Latin letter key. The essential "pulli" sign is found on the 0-key. All of the twelve vowel characters, 22 consonant characters, and two special signs that are needed to spell Tamil words are contained across keys 2 through 0 of the input panel 440, requiring only one key press per each desired Tamil character. The Tamil keymapping for each Tamil language character is shown in the tables of FIG. 5.

In one embodiment, if the user decides to input a sequence of Tamil language characters forming a word, the user begins by imagining the word in the basic Tamil alphabet and sounding it loud. Next, the user enters each Tamil character of the word in phonetic sequence on the input panel 440 of the keypad 420, by pressing a single corresponding English letter key that has the same sound for the specific Tamil character. The user input interface 210 transmits an input signal corresponding to each key pressed by the user to the processor 220. The processor 220 determines each input signal as one or more Tamil language characters corresponding to the specific key and searches the language database 230 to form at least one proposed word construct in Tamil using the proposed language characters.

The processor 220 further transmits the proposed word constructs to the display engine 240. The display engine 240 displays the proposed word constructs on the display screen 410. After each sequence of language characters forming a Tamil word construct is displayed on the display screen 410, if the word desired by the user is not fully displayed, the user presses a down arrow key within the navigation panel 430 of the keypad 420 to view other available Tamil word construct choices.

In an alternate embodiment, the processor 220 determines each input signal as one or more Tamil language characters corresponding to the specific key and transmits the proposed language characters to the display engine 240 for display on the display screen 410. The user input interface 210 subsequently facilitates selection by the user of intended language characters from the proposed characters to form a Tamil word construct.

Figure 6:
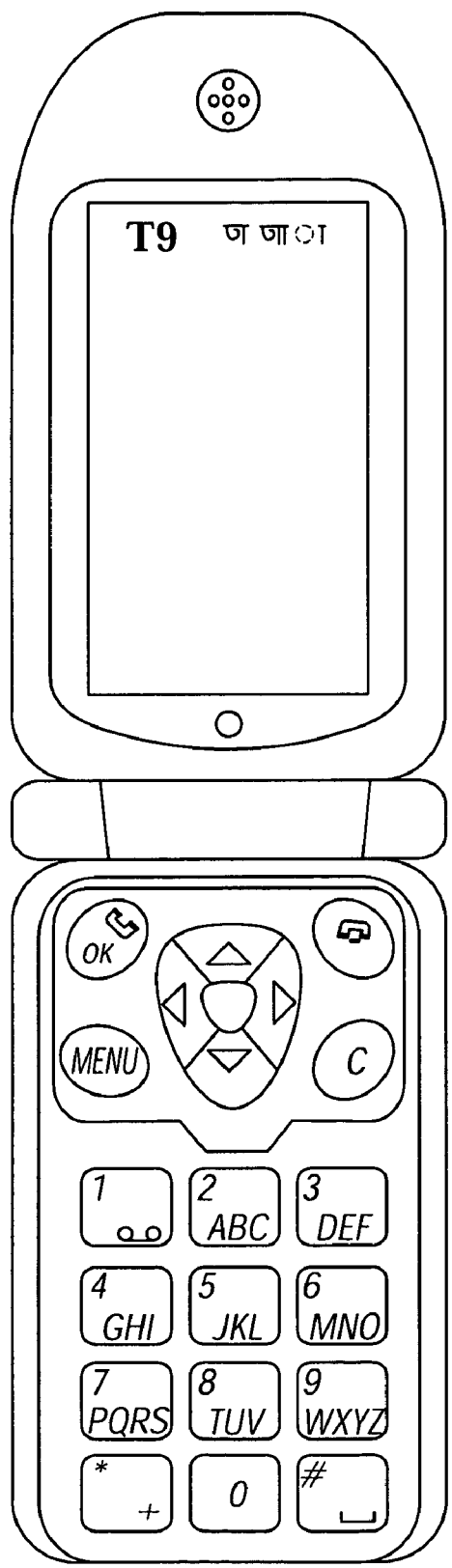
FIG. 6 illustrates a user interface for facilitating Hindi text input according to an alternate embodiment of the invention.

The foregoing similarity applies for Hindi, as shown in FIGS. 6 and 7. FIG. 6 illustrates a user interface for facilitating text input according to an embodiment of the invention. FIG. 7 illustrates a keyboard layout for facilitating text input according to the embodiment.

Figure 8:
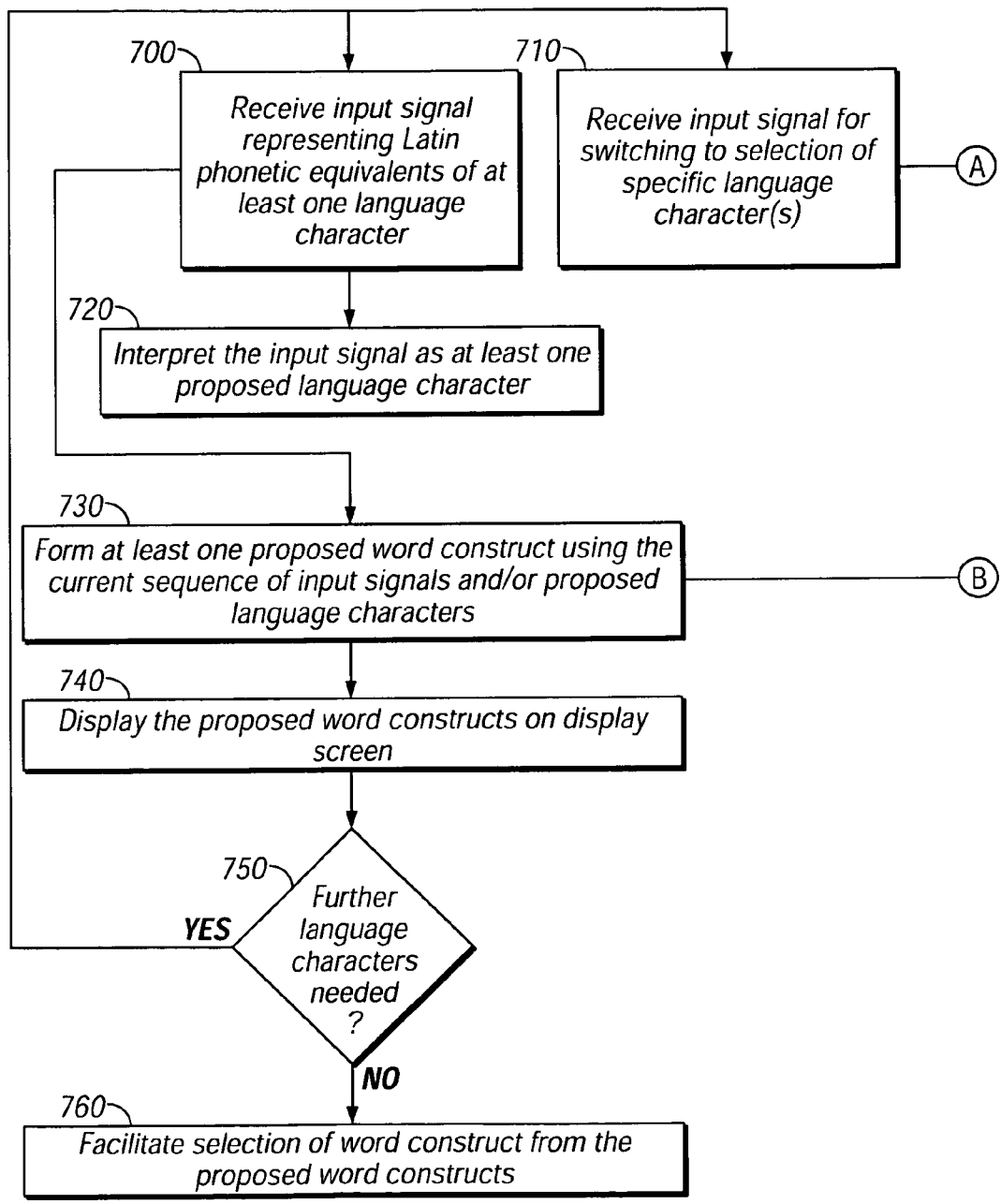
FIG. 8 is a flow diagram illustrating a method for facilitating text input according to an alternate embodiment of the invention.

FIG. 8 is a flow diagram illustrating a method for facilitating text input according to one embodiment of the invention. As illustrated in FIG. 8, at processing block 700, an input signal representing at least one language character printed or displayed on the keypad set is received, the at least one language character including a language character intended by the user to form a word construct in a language such as, for example, Hindu, Bengali or Tamil. At processing block 710, according to another embodiment of the invention, an alternative input signal is received that represents a mode change to the procedure illustrated in FIG. 9.

At processing block 720, the input signal is optionally translated into at least one proposed language character, such as, for example, one or more Hindu, Bengali or Tamil language characters. At processing block 730, at least one proposed word construct is formed using the proposed language characters represented by the current sequence of input signals. In one embodiment, the processor 220 uses the current sequence of input signals to search the language database 230 and form word constructs. In another embodiment, the processor 220 forms character sequences using the proposed or selected language characters, and filters the character sequences using the language database 230, e.g., eliminating invalid sequences based on the syllable structure of the language. In another embodiment, the processor 220 gives priority to word constructs in the language database 230 which include characters or syllables, represented by the current sequence of input signals, that occur more frequently in the language or the user's own pattern of writing.

At processing block 740, the word constructs are displayed for the user. In one embodiment, the display engine 240 displays the word constructs in the specified language on the display screen.

At processing block 750, a decision is made whether further language characters need to be input. If further language characters need to be input by the user, the procedure jumps to the processing block 700 and the sequence of blocks 700-750 is repeated. Otherwise, at processing block 760, selection of a word construct is facilitated. In one embodiment, the user input interface 210 facilitates selection of the word construct desired by the user from the word constructs displayed on the display screen. In an alternate embodiment, the user input interface 210 facilitates selection by the user of a word construct that contains the beginning of or most closely matches the intended word construct and facilitates input of further input signals from said user to form or select the word construct.

Figure 9:
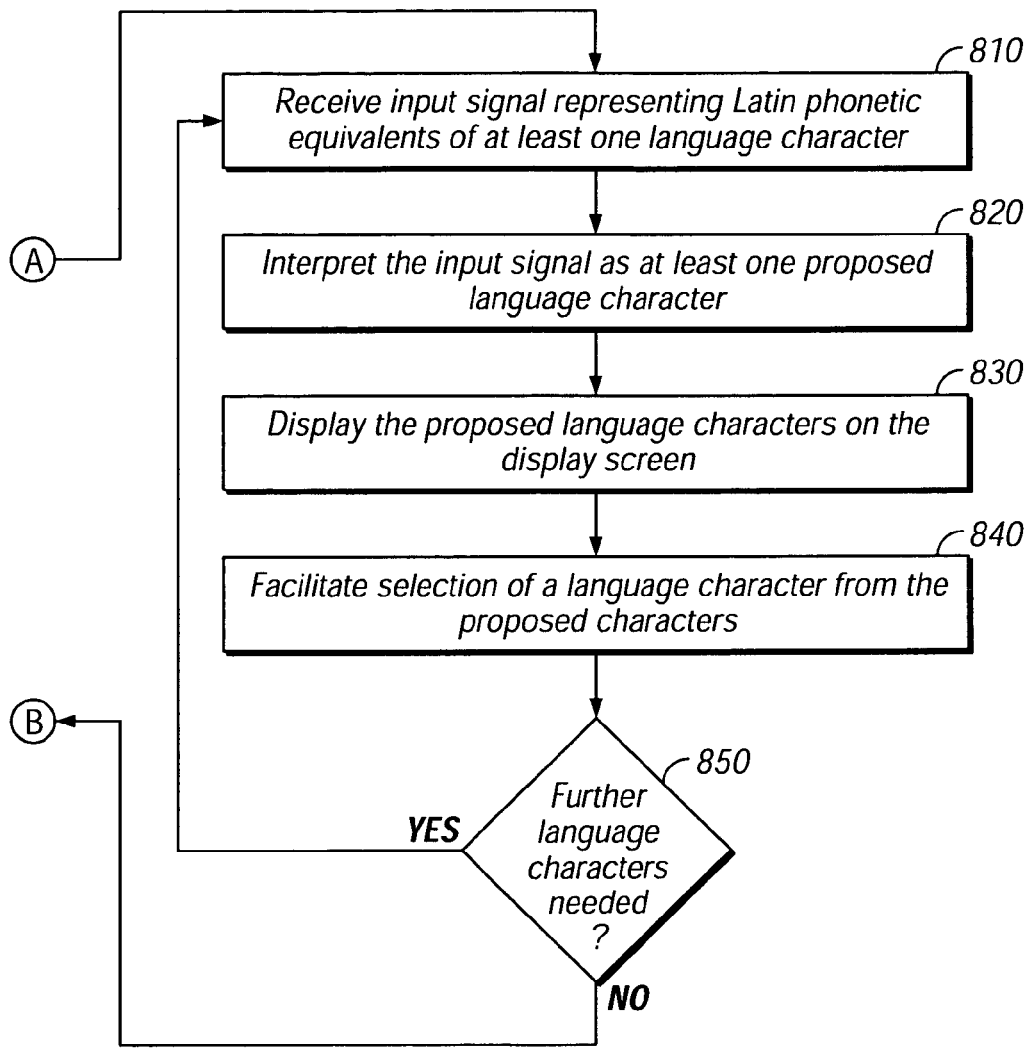
FIG. 9 is a flow diagram illustrating a method for facilitating text input according to an alternate embodiment of the invention.

FIG. 9 is a flow diagram illustrating an alternative method for facilitating text input as taught above in connection with FIG. 8 according to an alternate embodiment of the invention. A designated input signal may be employed to transfer the procedure from processing block 710 to processing block 810. As illustrated in FIG. 9, at processing block 810, an input signal representing phonetic equivalents of at least one language character displayed on the keypad set is received, the at least one language character including a language character intended by the user to form a word construct in a language such as, for example, Hindu, Bengali, or Tamil.

At processing block 820, the input signal is translated into at least one proposed language character, such as, for example, one or more Hindu, Bengali, or Tamil language characters. In one embodiment, the processor 220 searches the language database 230 and retrieves the proposed language characters to be displayed for the user.

At processing block 830, the proposed language characters are displayed for the user. In one embodiment, the display engine 240 displays the proposed language characters in the specified language on the display screen.

At processing block 840, selection of a language character is facilitated. In one embodiment, the user input interface 210 facilitates selection of a specific language character from the proposed language characters displayed on the display screen.

At processing block 850, a decision is made whether further language characters need to be input. In one embodiment, the system facilitates selection of more than one language character. If further language characters need to be input by the user to form the word construct, the procedure jumps to the processing block 810 and the sequence of blocks 810-850 is repeated. Otherwise, the procedure stops, or immediately returns to processing block 730 in FIG. 8. Any specific language characters that were selected during the above procedure may filter the proposed word constructs displayed in processing block 740, eliminating any word constructs that do not contain the specific language characters at the corresponding position in the current sequence of input signals.

Figure 10:
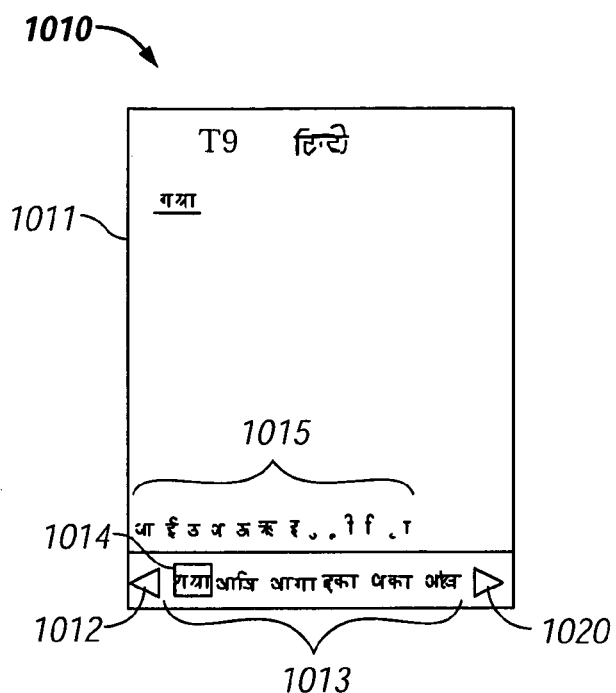
FIGS. 10, 11, and 12 illustrate embodiments of a display screen within a user interface for facilitating text input.
Figure 12:
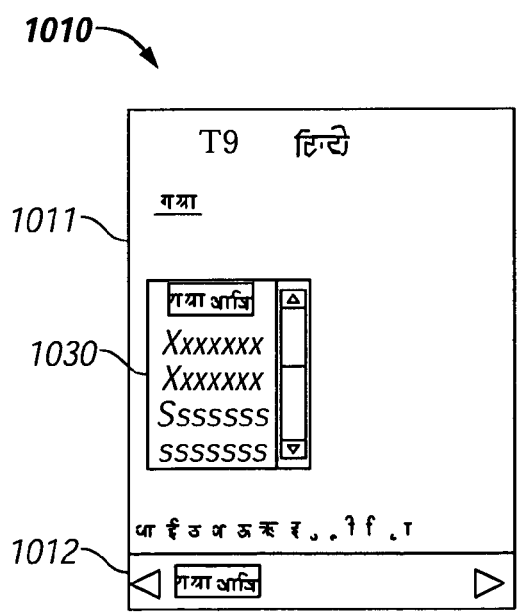
Figure 11:
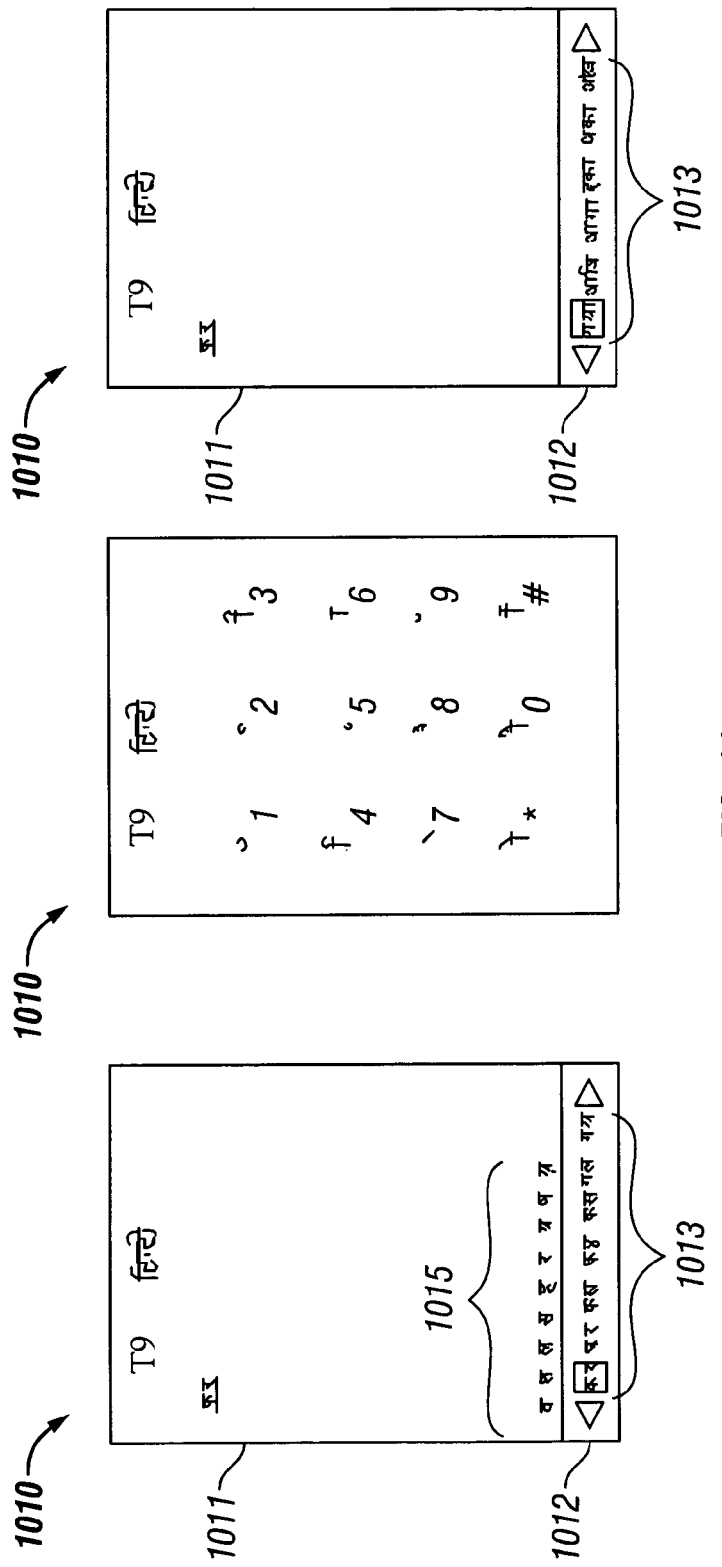

FIGS. 10, 11 and 12 illustrate embodiments of a display screen within a user interface for facilitating text input, such as, for example, user interface 210 described in detail in connection with FIGS. 2 and 3.

As illustrated in FIG. 10 in one embodiment the display screen 1010 further includes a first window 1011 for displaying a multi-tap sequence 1015, i.e. the complete set of associated language characters for a given key press on the input panel 340 or 440 within the corresponding keypad 320, 420 shown in FIGS. 2 and 3. In one embodiment, the multi-tap sequence 1015 is presented in a lighter font, such as, for example, in a grey color as opposed to the rest of the characters or proposed word constructs, which are presented in regular black font. In another embodiment, instead of showing a Halant in line, when the user requests display of a Halant, the display engine 240 shown in FIG. 1 displays the correct modified consonant. In another embodiment, a specific language character may be selected from the multi-tap sequence 1015 via keypad commands, such as, for example, key presses on the navigation panel 330, 430. As before, proposed word constructs may be filtered.

In one embodiment, the display screen 1010 further includes a second window 1012 for displaying horizontally a word choice list 1013, the word choice list containing proposed word constructs for the user. The window 1012 further includes scroll arrows 1020 accessible via keypad commands, such as, for example, key presses on the navigation panel 330, 430, to facilitate selection of a word construct 1014 from the word choice list 1013. As a result of the selection of the word construct 1014 desired by the user, the display engine 240 displays the word construct 1014 underlined and/or highlighted in the word choice list 1013.

As illustrated in FIG. 11, in one embodiment all dependent vowels are associated with the "*" key. If the user presses keys "4" and "9" on the keypad 320 or 420, the display engine 240 displays the word choice list 1013 in the window 1012 and the sequence of language characters 1015 in window 1011. As illustrated in FIG. 11, in one embodiment, if the user desires to enter a dependent vowel, the user presses the "*" key on the input panel 340, 440. Subsequently, the display engine 240 displays the matrix in the display screen 1010 to facilitate selection of the desired dependent vowel by the user by pressing the corresponding key. When the user selects the dependent vowel, the proposed word constructs are filtered. As illustrated in FIG. 11, in one embodiment, if the user presses the "6" key on the keypad 320 or 420, the display engine 240 displays the filtered word choice list 1013 in the window 1012.

Similarly, in an alternate embodiment, all modifiers are assigned to the "#" key. If the user desires to enter a modifier, the user presses the "#" key on the input panel 340, 440. Subsequently, the display engine 240 displays the modifier matrix in the display screen 1010 to facilitate selection of the desired modifier by the user by pressing the corresponding key. When the user selects the modifier, the proposed word constructs are filtered and subsequently displayed in the filtered word choice list 1013 in the window 1012.

In an alternate embodiment, completed word constructs, i.e. words that begin with the proposed language characters represented by the current sequence of input signals, are displayed separately, as illustrated in FIG. 12.

As shown in FIG. 12, subsequent to the input of English language phonetic equivalents of the language characters, the completed proposed word constructs are displayed in a scrollable window 1030 within the display screen 1010 and accessible to the user via key presses within the navigation panel 330 or 430. In one embodiment, the default length of the list of completed proposed word constructs is set at a predetermined value.

It is to be understood that embodiments of this invention may be used with other languages based on other scripts, such as Thai, Vietnamese, Arabic, or Cyrillic.

It is to be understood that embodiments of this invention may be used as or to support software programs executed upon some form of processing core (such as the CPU of a computer) or otherwise implemented or realized upon or within a device or computer readable medium. A machine readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, e.g. carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method, comprising the steps of:
  mapping each character or phonetic symbol in a language to a key on a reduced keyboard by associating its corresponding sound with the closest phonetic sound corresponding to a Latin-based letter assigned to a reduced keyboard key;
  entering a series of constituent base characters of a desired word in a phonetic order using said mapped phonetic symbols, wherein said step of entering comprises:
    receiving at least a first input signal representing a Latin phonetic equivalent of at least one character;
    receiving a switching signal indicating a mode change followed by receiving at least one additional input signal in a particular position within the series of constituent base characters, wherein said at least one additional input signal is translated into a Hindu, Bengali, or Tamil character, forming a specific language character intended for a particular position; and
  forming a list of possible word constructs containing both (1) said first input signal representing a Latin phonetic equivalent of at least one character and (2) said at least one additional input signal represented as a Hindu, Bengali, or Tamil character, wherein said list possible word constructs includes possible word constructs containing said constituent base characters in an order different than said phonetic order;
  filtering possible word constructs not containing said specific language character in the intended position from said list of possible word constructs, forming a filtered list of word constructs; and
  displaying said filtered list of word constructs.

2. The method of claim 1, wherein if said character or phonetic symbol represents a dipthong of more than one sound, a first sound of said dipthong is used to determine said mapping.

3. A text input method, comprising the steps of:
  receiving a plurality of input signals from a user, each input signal corresponding to a key on a reduced keyboard within a user input interface and further representing phonetic equivalents of at least one language character including a language character intended by said user to form a word construct in a language, wherein said step of receiving comprises:
    receiving a first input signal representing a Latin phonetic equivalent of at least one character;
    receiving at least one additional input signal at a particular position within the plurality of input signals, following receiving a switching signal indicating a mode change, wherein said at least one additional input signal is translated into a Hindu, Bengali, or Tamil character, forming a specific language character intended for a particular position; and
  forming a list of possible word constructs in said language using both (1) said first signal representing a Latin phonetic equivalent of at least one character and (2) said at least one additional input signal represented as a Hindu, Bengali, or Tamil character;
  filtering possible word constructs not containing said specific language character in the intended position from said list of possible word constructs, forming a filtered list of word constructs; and
  displaying said filtered list of word constructs for said user on a display screen.

4. The method according to claim 3, wherein said forming step further comprises the step of:
  matching said input signals with a corresponding entry in a language database.

5. The method according to claim 3, further comprising the step of:
  facilitating selection by said user of at least one of said possible word constructs displayed on said display screen.

6. The method of claim 3, further comprising the steps of:
  forming a plurality of character sequences based on partial and/or completed word constructs retrieved from a database.

7. The method according to claim 3, further comprising the steps of:
  facilitating selection by said user of a word construct that partially or most closely matches said word construct from said at least one proposed word construct; and
  facilitating input of further input signals from said user to form said word construct.

8. A text entry method, comprising the steps of:
  receiving a plurality of input signals from a user, each of said input signals corresponding to a key on a reduced keyboard within a user input interface and further representing language phonetic equivalents of at least one language character including a language character intended by said user to form a word construct in a language, wherein said step of receiving comprises:
    receiving a first input signal representing a Latin phonetic equivalent of at least one character;
    receiving a switching signal indicating a mode change followed by receiving at least one additional input signal in a particular position, wherein said at least one additional second input signal is translated into a Hindu, Bengali, or Tamil character, forming a specific language character intended for a particular position; and
  using said first input signal to generate a first proposed language character;
  using said at least one additional input signal to generate a at least one additional proposed language character;
  displaying successively said at first proposed language character and said at least one additional proposed language character for said user on a display screen;
  facilitating successive selection by said user of said language character for said each input signal to form said word construct; and
  forming a list of possible word constructs using both (1) said first input signal representing a Latin phonetic equivalent of at least one character and (2) said second input signal represented as a Hindu, Bengali, or Tamil character;
  filtering possible word constructs not containing said specific language character in the intended position from said list of possible word constructs, forming a filtered list of word constructs.

9. The method of claim 8, further comprising the step of:
  matching and displaying word completions based on initial or partial word constructs.

10. A text entry apparatus, comprising:
a user input interface for receiving a plurality of input signals from a user, each input signal corresponding to a key on a reduced keyboard within said user input interface and further representing language phonetic equivalents of more than one language character including a language character intended by said user to form a word construct in a language, wherein said plurality of input signals comprise all of:
at least one ambiguous input signal representing a Latin phonetic equivalent of at least one character;
a switching signal indicating a mode change to an explicit mode of character entry whereby specific language characters are entered through the input of a key by a means for disambiguating the intended entry of the more than one language character present in the inputted key; and
at least one additional input signal comprising an explicit character at a particular position within the plurality of input signals, wherein said at least one additional input signal is translated into a Hindu, Bengali, or Tamil character, forming a specific language character intended for a particular position; and
forming a list of possible word constructs using both (1) said at least one ambiguous signal representing a Latin phonetic equivalent of at least one character and (2) said at least one additional input signal represented as a Hindu, Bengali, or Tamil character;
a processor coupled to said user input interface for using said each ambiguous input signal to generate at least one proposed language character, for forming a list of proposed word constructs in said language using said at least one proposed language character, and for filtering said proposed word constructs not containing said explicit character at said particular position within the plurality of input signals, forming a filtered list of word constructs; and
a display engine coupled to said processor for displaying said filtered list of word constructs for said user on a display screen.

11. The apparatus according to claim 10, wherein said processor further comprises:
means for retrieving said list of proposed word constructs from a language database.

12. The apparatus according to claim 10, wherein said user input interface further comprising:
means for facilitating selection by said user of said word construct from said filtered list of word constructs displayed on said display screen.

13. The apparatus according to claim 10, wherein said user input interface further comprising:
means for facilitating selection by said user of a word from the filtered list of word constructs.

14. A text entry apparatus, comprising:
a user input interface for receiving a plurality of input signals from a reduced keyboard by a user wherein said input signals comprise all of:
a first input signal representing a Latin phonetic equivalent of at least one character; and
a second input signal following a switching signal indicating a mode change, wherein said second input signal is translated into a Hindu, Bengali, or Tamil character, forming a specific language character intended for a particular position; and
a processor coupled to said user input interface for using said each input signal to generate a plurality of proposed language characters; and a display engine coupled to said processor for displaying successively said plurality of proposed language characters for said user on a display screen, forming a list of possible word constructs:
a means for filtering possible word constructs not containing said proposed language characters in the intended positions from said list of possible word constructs, forming a filtered list of word constructs containing potential word constructs; and
said user input interface further comprising means for facilitating selection by the user of a potential word construct.

15. A text entry system, comprising:
means for receiving a plurality of input signals from a reduced keyboard by a user, each input signal corresponding to a key within a user input interface and further representing language phonetic equivalents of at least one language character comprising a language character intended by said user to form a word construct in a language, wherein said input signals comprise all of:
a first input signal representing a Latin phonetic equivalent of at least one character; and
at least one additional input signal in a particular position, following a switching signal indicating a mode change, wherein said at least one additional input signal is translated into a Hindu, Bengali, or Tamil character, forming a specific language character intended for a particular position; and
means for using said each input signal to generate a list of possible word constructs containing at least one proposed language character, wherein said at least one proposed language character comprises a consonant with a declined implicit vowel;
a means for filtering possible word constructs not containing said at least one additional input signal in the intended position from said list of possible word constructs, forming a filtered list of word constructs;
means for displaying successively said filtered list of word constructs for said user on a display screen; and
means for facilitating successive selection by said user of said language character for said each input signal to form said word construct.

16. A computer readable medium consisting of media selected from among ROM, RAM, magnetic disk storage media, optical storage media, and flash memory devices, said media containing executable instruction, which, when executed in a processing system, cause said processing system to perform a text entry method comprising the steps of:
receiving a plurality of input signals from a reduced keyboard by a user, each input signal corresponding to a key within a user input interface and further representing language phonetic equivalents of at least one language character comprising a language character intended by said user to form a word construct in a language, wherein at least one series of said plurality of input signals comprises a consonant plus a matra plus a sign cluster combining to represent a conjunct, wherein said plurality of input signals comprise all of:
a first input signal representing a Latin phonetic equivalent of at least one character; and
at least one additional input signal in a particular position, following a switching signal indicating a mode change, wherein said at least one additional input signal is translated into a Hindu, Bengali, or Tamil character, forming a specific language character intended for a particular position; and using said first input signal to generate at least a first proposed language character;

using said at least one additional input signal to generate at least a second proposed language character;

forming at least one list of possible word constructs using said first proposed language character and said second proposed language character;

filtering possible word constructs not containing said at least one additional input signal in the intended position from said list of possible word constructs, forming a filtered list of word constructs; and displaying said filtered list of word constructs for said user on a display screen.

17. A computer readable medium consisting of media selected from among ROM, RAM, magnetic disk storage media, optical storage media, and flash memory devices, said media containing executable instructions which, when executed in a processing system, cause said processing system to perform a text entry method comprising the steps of:

receiving a plurality of input signals from a keyboard by a user, each input signal corresponding to a key within a user input interface and further representing language phonetic equivalents of at least one language character comprising a language character intended by said user to form a word construct in a language, wherein said plurality of input signals are entered on a standard telephone input keypad, wherein all eleven vowel characters, thirty-five consonant characters, and three special sign characters needed to spell Bengali words are contained across keys 2 through 0 of said standard telephone input keypad, wherein said input signals comprise all of:

a first input signal representing a Latin phonetic equivalent of at least one character; and at least one additional input signal, following a switching signal indicating a mode change, wherein said at least one additional input signal is translated into a Hindu, Bengali, or Tamil character, forming a specific language character intended for a particular position; and using said each input signal to generate at least one proposed language character, wherein the first input signal and the at least one additional input signal forms a list of possible word constructs;

filtering possible word constructs not containing said proposed language characters in the intended positions from said list of possible word constructs, forming a filtered list of word constructs containing potential word constructs;

displaying successively said at least one proposed language character for said user on a display screen; and facilitating successive selection by said user of potential word constructs.

* * * * *